United States Patent
Hong et al.

[11] Patent Number: 5,534,160
[45] Date of Patent: Jul. 9, 1996

[54] METHOD FOR THE RE-TREATMENT OF RESIDUE GENERATED FROM THE REMOVAL OF FLUORINE DISSOLVED IN WASTE WATER

[75] Inventors: Young H. Hong; Jae H. Roh; Sang M. Woo, all of Seoul, Rep. of Korea

[73] Assignee: Lucky Metals Corporation, Seoul, Rep. of Korea

[21] Appl. No.: 229,657

[22] Filed: Apr. 19, 1994

[30] Foreign Application Priority Data

May 7, 1993 [KR] Rep. of Korea ............... 7838/1993

[51] Int. Cl.$^6$ ............................................. C02F 1/58
[52] U.S. Cl. ................. 210/710; 210/915; 423/21.1; 423/263
[58] Field of Search ................. 423/21.1, 263; 210/710, 912, 915

[56] References Cited

U.S. PATENT DOCUMENTS

| | | | |
|---|---|---|---|
| 3,252,754 | 5/1966 | Kraitzer | 423/21.1 |
| 3,353,928 | 11/1967 | Woyski et al. | 423/21.1 |
| 4,954,293 | 9/1990 | Cailly et al. | 423/21.1 |
| 4,976,939 | 12/1990 | Fabre et al. | 423/21.1 |
| 5,039,336 | 8/1991 | Feuling | 423/21.1 |
| 5,207,995 | 5/1993 | Bosserman | 423/21.1 |

Primary Examiner—Neil McCarthy
Attorney, Agent, or Firm—Merchant, Gould, Smith, Edell, Welter & Schmidt

[57] ABSTRACT

A method for the re-treatment of residue generated in the course of removing fluorine from waste water.

The method comprises the step of: drying the residues consisting of rare earth fluorides, which are generated in the course of treating the waste water with a rare earth compound to remove fluorine ions from the waste water; mingling the rare earth fluorides with a sodium hydroxide solid; heat treating the rare earth fluorides at temperatures ranging from approximately 320° to approximately 450 ° C. for times ranging from approximately 0.5 to approximately 5 hours; and applying wash and dry to the heat-treated resultant, in due order.

The invention pertains to the reuse of rare earth elements used in the treatment of fluorine. Products obtained by carrying out the method contain rare earth hydroxides, which are useful as materials for glass abrasive or for treating fluorine, catalysts, and other materials for the fields of using a variety of rare earth.

1 Claim, 2 Drawing Sheets

METHOD FOR THE RE-TREATMENT OF RESIDUE GENERATED FROM THE REMOVAL OF FLUORINE DISSOLVED IN WASTE WATER

BACKGROUND OF THE INVENTION

The present invention relates, in general, to a treatment method for reusing fluorine-treated residue and, more particularly, to a method for re-treating with rare-earth compounds residue which is generated in the course of removing dissolved fluorine ions from waste water, so as to reuse the residue.

In the natural world, there exists a trace amount of fluorine by nature, for instance, about 1.2 to 1.4 ppm in the marine water. This trace amount of fluorine does not cause any problems in view of ecological environment. Now, the use of fluorine or fluorine-containing compounds, however, is extensively increased as various industries, such as electromagnetic, metallic, chemical or ceramic industries, have been rapidly developed. For example, fluorine or fluorine-containing compounds are used for manufacturing semiconductors, washing the interior of a cathode ray tube, manufacturing aluminum, etc.

Waste water released from a plant pertaining to the industries contains fluorine which is in a free radical state or combined state with other elements or compounds, and the concentration of fluorine in the waste water often comes to several hundreds ppm, which is very dangerous in view of ecology, affecting human bodies, animals or plants detrimentally. Accordingly, it is required to lower the concentration of the fluorides in the waste water.

In an effort to lower the concentration of fluorine in the waste water, there has been proposed such a method for treating the fluorine-containing waste water that at least one species selected from a calcium compound, e.g. $Ca(OH)_2$, an aluminum compound, e.g. $Al_2(SO_4)_3$ and a phosphoric acid compound is added to the waste water, so as to insolubilize the fluorine ions, and the resulting supernatant and sludge is separated from each other.

However, the above conventional method is problematic in that a good deal of chemical reagents are needed, generating a great amount of sludge. Even though this generated sludge is buried, fluorides are eluted therefrom, so that a plurality of alkaline chemical reagents necessary to neutralize the fluorides are demanded. What is still worse, this conventional method is not so effective to the removal of the fluorine.

In order to solve the problems, rare earth compounds have recently been used as fluorine-removing agents, in lieu of calcium oxide ($Ca(OH)_2$) or aluminum sulfate ($Al_2(SO_4)_3$). Rare earth elements along with fluorine form rare-earth fluorides, very stable compounds. Since these rare-earth fluorides formed are very insoluble, there is brought about an excellent effect on removing the fluorine dissolved in the waste water. In addition, the use of rare earth compounds is characterized by the fact that only a small amount of residue is generated after the treatment by virtue of the insolubility of the rare-earth fluorides.

Rare earth ore is grouped into bastnasite, monazite and xenotime. Bastnasite consists of a type of $LnCO_3F$ wherein Ln is a general term for representing rare earth elements, such as La, Ce, Pr and the like, whereas monazite and xenotime each consists of a type of $LnPO_4$.

Taking account into economy, the use of monazite or xenotime is improper due to its content of high-priced elements. For instance, thorium (Th) is contained in amounts ranging from 5 to 10% by weight in monazite and other high-priced rare-earth elements are contained in xenotime. In addition, such ores have elements unsuitable to remove fluorine ions, because the fluorides thereof have large solubilities, relative to that of the light rare earth elements. Therefore, in advance of using these ores, there must be carried out such a treatment that the unsuitable elements are removed therefrom, which is one factor of cost increase.

It is very difficult to reduce the treatment cost to a certain level. For example, even though the amount of the rare earth element could be reduced considerably as a result of intensive studies, it is impossible to cut down the amount thereof unlimitedly since it must be basically used in an amount of not less than equivalent weight and the amount of the removed fluorides is proportional to its amount used. The cost of manufacturing articles is raised according to the use of the high-priced rare earth elements for removing the fluorine contained in waste water and to the augmentative amount thereof. Accordingly, it is economically unadvantageous unless the reuse of the rare earth elements is accompanied by re-treating the residue which is generated in the course of removing fluorine from waste water.

Japanese Patent Laid-Open Publication No. Sho. 61-192385 (hereinafter, referred to as "the prior art") discloses that the rare earth elements can be reused by contacting an insoluble rare earth compound with waste water to absorb fluorine or fluorine-containing compounds, desorbing the absorbed fluorine with an alkaline solution and recovering rare earth elements in the forms of insoluble rare earth compounds and alkaline fluorides. The prior art is a kind of a desorption method in which the rare earth fluorides are treated with a $Ca(OH)_2$ solution or a NaOH solution, to give alkaline fluorides which are subsequently added with $Ca(OH)_2$, to precipitate calcium fluorides and to reuse the alkaline solution.

However, the prior art utilizing the alkaline solution has many difficulties. First, the dependance of alkaline solution on ion exchange reaction could cause poor reaction efficiency. In addition, after the desorption, pH is required to be lowered by neutralizing the eluting solution. Further, when the generated alkaline fluorides are treated with $Ca(OH)_2$, a great deal of $CaF_2$ residues are formed, so that the fluorine of above a certain concentration ($CaF_2$ solubility 8 mg/e) always remains in the solution. Furthermore, as seen from the case that the desorbing solution has to be added with the precipitating agent, a great amount of treating chemicals are needed. Accordingly, the prior art is disadvantageous in that its processes are intricate and uneconomical.

In particular, the prior art says, in detail, only about recovering the alkaline solution for reuse, but does not disclose qualities according to the recovery of rare-earth compounds, and related technical contents, neither.

By contrast with the re-treatment methods utilizing soluble rare earth compounds to remove fluorines from the waste water, re-treatment methods utilizing soluble rare earth compounds still have not been established.

SUMMARY OF THE INVENTION

Based on intensive and thorough study for the effective treatment of the residues generated in the course of removing fluorine ions from waste water by the present inventors, the invention comes to be proposed.

It is, therefore, an object of the present invention to provide a method for the re-treatment of the residues generated when treating waste water with a rare earth compound, superior in effectiveness.

It is another object of the present invention to provide a method for the re-treatment of the residue generated when treating waste water with a rare earth compound, capable of utilizing both soluble and insoluble rare earth compounds.

It is a further object of the present invention to provide a method for the re-treatment of the residues generated when treating waste water with a rare earth compound, capable of recovering the rare earth elements in a simple and economic manner.

According to the present invention, the above objects could be accomplished by providing a method for re-treating fluorine-treated residues of waste water, comprising the step of: drying the residues consisting of rare earth fluorides, which are generated in the course of treating the waste water with a rare earth compound to remove fluorine ions from the waste water; mingling the rare earth fluorides with a sodium hydroxide solid; heat treating the rare earth fluorides at temperatures ranging from approximately 320° to approximately 450° C. for times ranging from approximately 0.5 to approximately 5 hours; and applying wash and dry to the heat-treated resultant, in due order.

BRIEF DESCRIPTION OF THE DRAWINGS

The above objectives and other advantages of the present invention will become more apparent by describing in detail the preferred embodiment of the present invention with reference to the attached drawings in which.

DETAILED DESCRIPTION OF THE INVENTION

Rare earth has been utilized for a variety of purposes since its characteristic electromagnetic properties were discovered. For example, it is used as a deoxidizer or a seeding agent in steel industry, an agent for manufacturing a glass valve for T.V. Braun tube, a fluorescent, an abrasive, a catalyst, a permanent magnet, a ceramic material and etc. The rare earth used as the above purposes mainly consists of light rare earth elements, such as Ce, La and the like, which has a composition similar to that of a fluorine-treating agent employing light rare earth elements.

The present invention pertains to the reuse of the residues which are generated by treating waste water with a rare earth compound to remove the fluorine ions contained in the water. In the present invention, the residues are subjected to heat treatment and alkali treatment, and turned into a useful material which can be applied to a material for glass abrasive or can be again utilized for the treatment of the fluorines, or into a raw material in rare earth-related fields, such as catalysts, etc.

Hereinafter, a method for reusing the rare earth fluorides, the residues generated from the removal of the fluorines dissolved in waste water, will be, in detail, described, according to the present invention.

Figure 1:
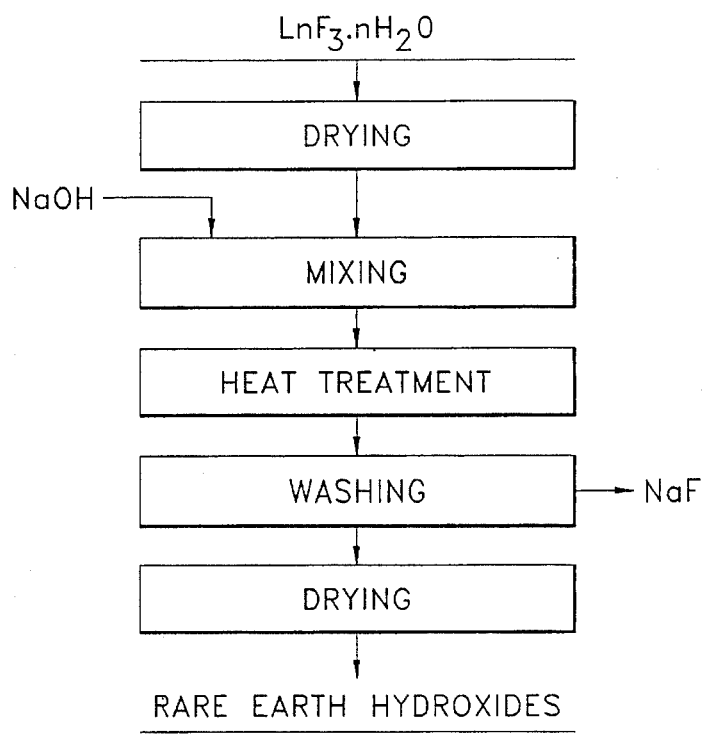
FIG. 1 is a block diagram showing the flow of the method according to the present invention.

Referring to FIG. 1, there is illustrated a method for the re-treatment of residues generated from the removal of fluorines dissolved in waste water, in accordance with the present invention. As shown in FIG. 1, the rare earth fluorides, the residues, are dried and then, sufficiently mixed with an alkaline solid. This mixture is subjected to heat treatment, so as to decompose the rare earth fluorides into rare earth hydroxides. As a result of this heat decomposition, there is obtained a solid lump consisting of rare earth hydroxides and alkaline fluoride salts which are soluble in water. A washing process is carried out, to remove the soluble alkaline fluoride salts therefrom. Thereafter, a high liquid separation process is applied to the resulting aqueous solution deprived of the alkaline fluoride salts, to give pure rare earth hydroxides, which are subsequently dried. In the meanwhile, the washed alkali fluorides are recovered by a recovering process.

Alkali used in the present invention preferably includes sodium hydroxide.

The weight ratio of the dried rare earth fluorides to the alkaline solid is on the order of from about 0.6 to about 1.0, and preferably from about 0.8 to about 0.9. In the ratio range, since the lowermost value, 0.6, is near the equivalent value at which the rare earth fluoride is decomposed into rare earth hydroxide by heat, less than 0.6 ratio value is undesirable. On the other hand, more than 1.0 ratio value is a disadvantage in view of economy because the weight ratio is not critical if it is above the equivalent value.

As the matter of preference, the mixture of the rare earth fluorides and sodium hydroxide is treated in a furnace keeping temperatures higher than the dissolution temperature of sodium hydroxide solid, 318 ° C. (see The Merck Index, 11th ed). Accordingly, preferred temperature is at least approximately 320 ° C. and more preferred temperature is at least approximately 330 ° C. This heat treatment is carried out for from approximately 10 minutes to approximately 5 hours and preferably from approximately 30 minutes to approximately 3 hours.

Using water, the soluble alkaline fluoride salts are removed. This washing process employing hot water, for example, 50 ° C. or more water, would be effectively carried out.

The high liquid separation process used in the present invention may be a conventional solid-liquid separation process performing filtration, decantation, centrifuge or dehydration. The drying processes used in the present are carried out around 100 ° C. in the air or under a reduced pressure.

Consequently, the obtained rare earth hydroxides can be utilized as raw materials for various articles containing rare earth.

In order to better understand the nature of the present invention, a number of examples will now be described.

EXAMPLE 1

A water-soluble fluorine compound, such as potassium fluoride, ammonium fluoride or fluoric acid, was dissolved in water and added with a rare earth chloride solution, a treating agent for dissolved fluorine. After being stirred, the resulting solution was subjected to general high liquid separation and dried at 100° C. for 48 hours, to obtain rare earth fluorides.

To 100 g of the obtained rare earth fluorides, 90 g of sodium hydroxide solid (weight ratio 0.9) was added, and well mingled therewith. The mixture solid was spread out in a vessel, preferably made of mild steel, and was subjected to heat decomposition in a furnace keeping 350° C. and for 1 hour. As a result of the heat reaction, decomposed products were obtained. These obtained, decomposed products were washed with water of 80° C., so as to dissolve alkali fluorides and unreacted sodium hydroxides, and thereafter, a general high liquid separation process was carried out, to isolate rare earth hydroxides. After being dried, 70 g of the rare earth hydroxides were analyzed with X-ray and quantitatively.

Figure 2:
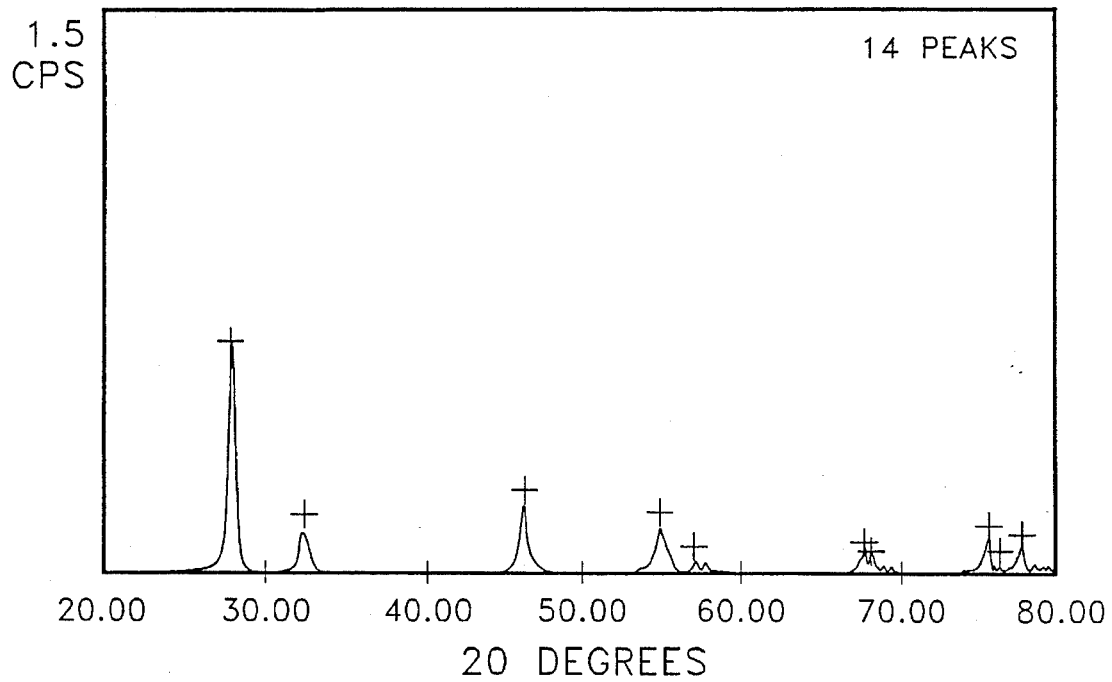
FIG. 2 is an X-ray diffraction spectrum of the rare earth hydroxide obtained through Example 1 of the present invention.

The X-ray spectrum and the result of the quantitative analysis are given as shown in FIG. 2 and in the following Table 1, respectively.

EXAMPLE 2

An alkaline heat decomposition was carried out in a manner similar to that of Example 1, except that the weight ratio of rare fluoride to sodium hydroxide was 0.6.

Similarly, the washing, the high liquid separation, and the drying processes were applied to the decomposed products, in due order, to obtain rare earth hydroxides, which were then subjected to X-ray diffraction and quantitative analyses.

Figure 3:
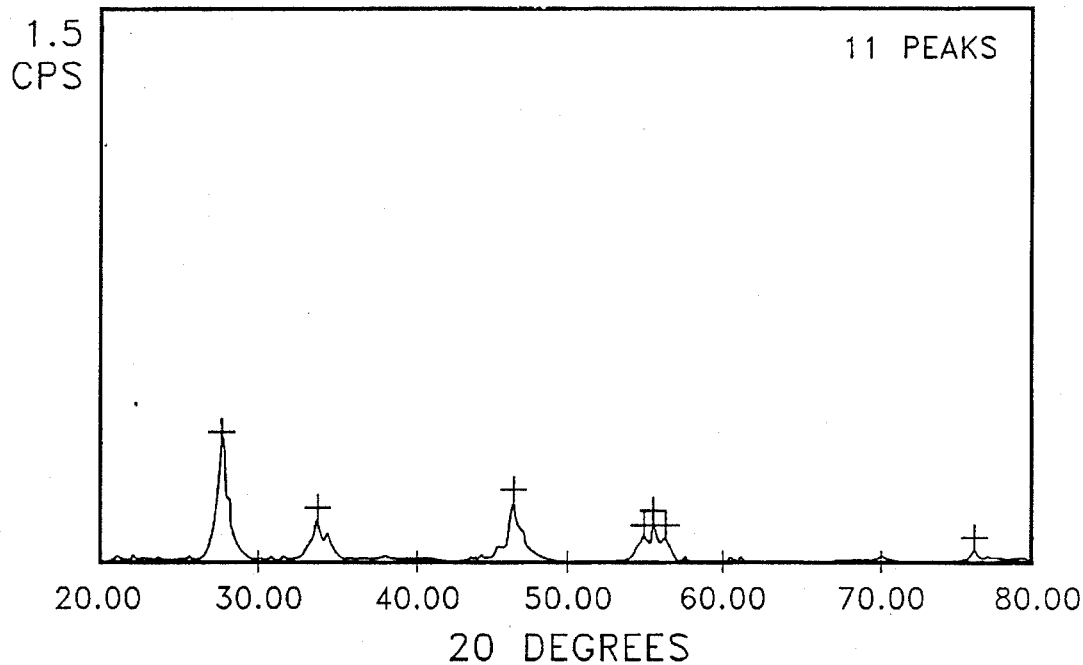
FIG. 3 is an X-ray diffraction spectrum of the rare earth hydroxide obtained through Example 2 of the present invention.

The results of the analyses are given as shown in FIG. 3 and the following Table 1, respectively.

EXAMPLE 3

An alkaline heat decomposition was carried out in a manner similar to that of Example 1, except that the weight ratio of rare fluoride to sodium hydroxide was 0.9 and the decomposition temperature was around 320° C.

Similarly, the washing, the high liquid separation, and the drying processes were applied to the decomposed products, in due order, to obtain rare earth hydroxides, which were then subjected to X-ray diffraction and quantitative analyses.

Figure 4:
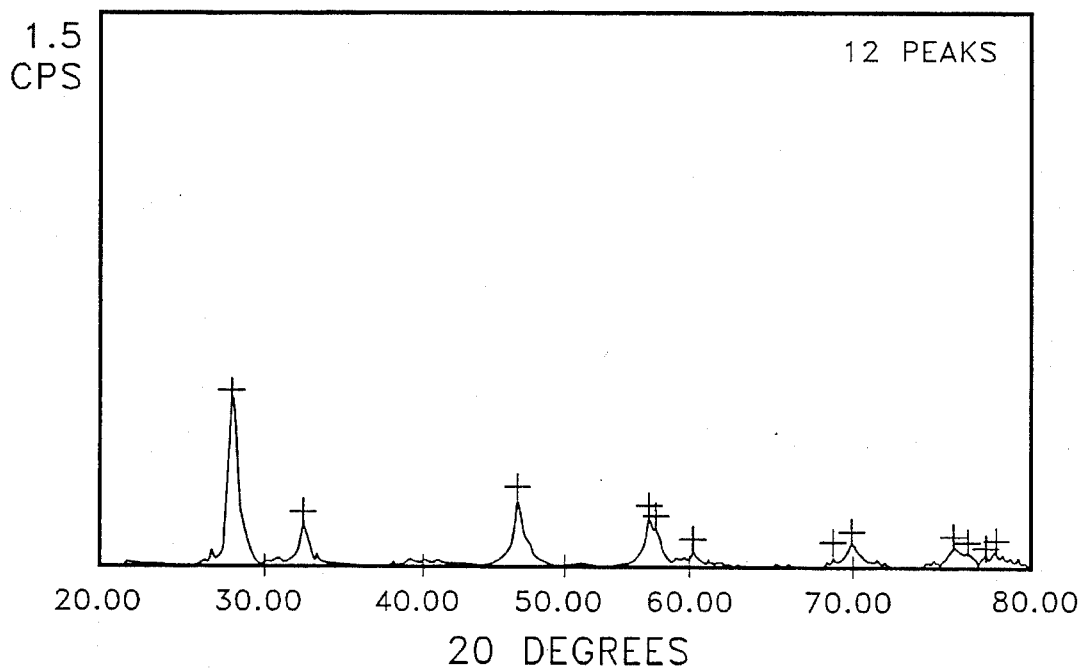
FIG. 4 is an X-ray diffraction spectrum of the rare earth hydroxide obtained through Example 3 of the present invention.

The results of the analyses are given as shown in FIG. 4 and the following Table 1, respectively.

TABLE 1

| | unit: % by weight | | | | | |
|---|---|---|---|---|---|---|
| Example | Total Ln*$_2$O$_3$ | CeO$_2$ | La$_2$O$_3$ | Nd$_2$O$_3$ | Pr$_6$O$_{11}$ | F |
| Example 1 | 90.6 | 47.8 | 24.3 | 14.8 | 3.7 | 2.9 |
| Example 2 | 87.8 | 46.3 | 23.6 | 14.3 | 3.6 | 0.4 |
| Example 3 | 87.3 | 46.4 | 23.1 | 14.2 | 3.6 | 3.2 |

*a general term for representing rare earth elements, such as La, Ce, Pr and the like.

As described hereinbefore, rare earth fluorides, the residues generated in the course of treating waste water, can be changed into rare earth products with a high quality of more than 87% by adding NaOH and applying the steps of heat treatment, washing and drying, according to the present invention.

From the examples and the table, it is apparent that the rare earth products obtained according to the method of the present invention are capable of being reused for materials for glass abrasive or for treating fluorine, catalysts, and other materials for the fields of using a variety of rare earth.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for treating waste water containing fluorine, comprising the steps of:

adding rare earth compounds to said waste water to give rare earth fluorides;

separating the rare earth fluorides from the waste water;

drying the rare earth fluorides;

mingling the dried rare earth fluorides with solid sodium hydroxide, the weight ratio of said dried rare earth fluorides to sodium hydroxide being from about 0.6 to about 1.0;

heating the resultant admixture at a temperature in the range of about 320° C. to about 450° C. for about 0.5 to about 5 hours, thereby obtaining a solid lump consisting of rare earth hydroxides and alkaline fluoride salts; and subjecting said solid lump to a washing process with water and a solid-liquid separation process, so as to obtain rare earth hydroxides.

* * * * *